UNITED STATES PATENT OFFICE.

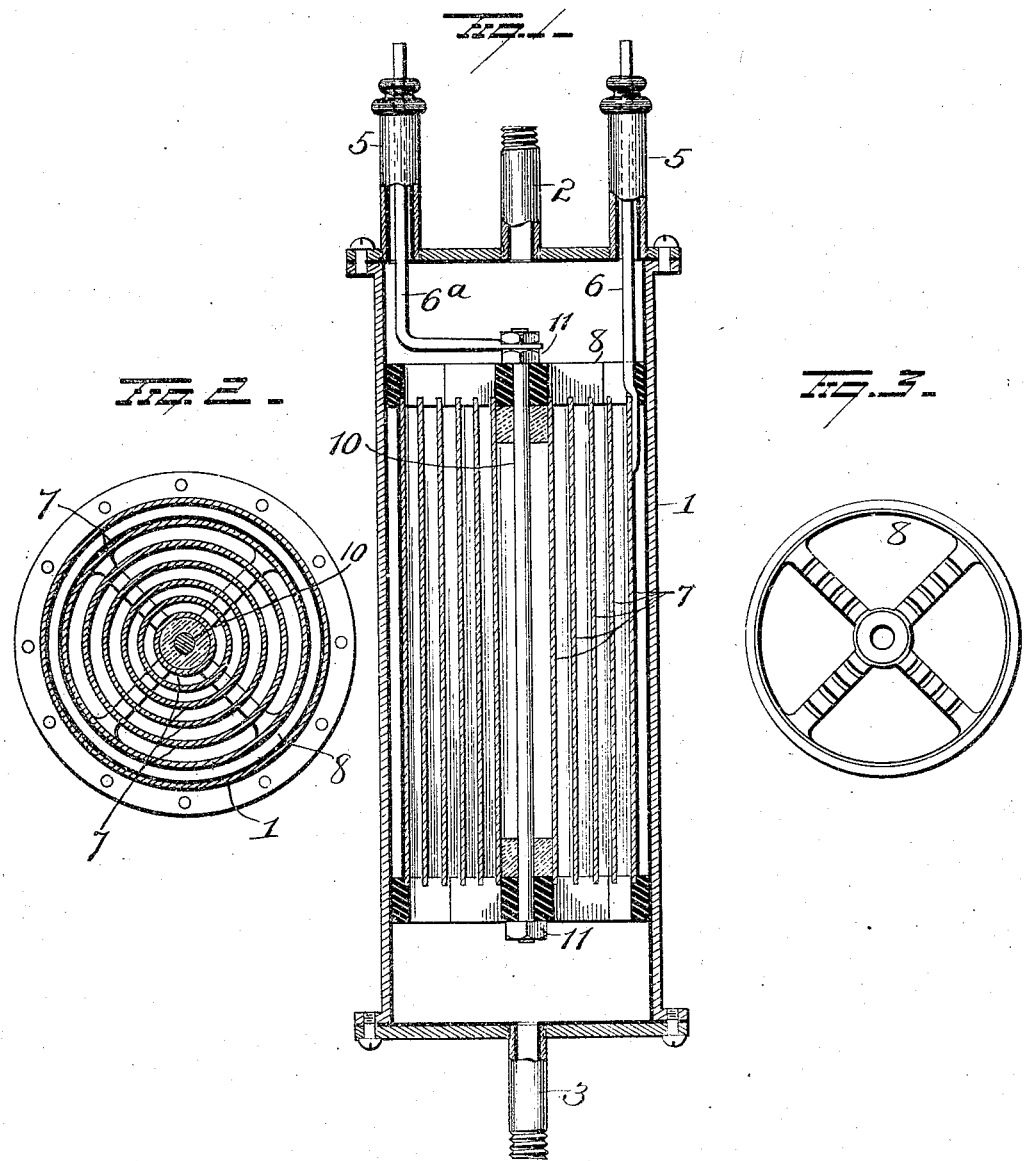

FRANK B. HINKSON, OF NEW CASTLE, PENNSYLVANIA, ASSIGNOR TO THE ELECTRIC LIQUID PURIFYING AND FILTERING COMPANY, OF PITTSBURG, PENNSYLVANIA.

WATER-PURIFIER.

No. 820,113. Specification of Letters Patent. Patented May 8, 1906.

Application filed May 31, 1905. Serial No. 263,136.

*To all whom it may concern:*

Be it known that I, FRANK B. HINKSON, a resident of New Castle, in the county of Lawrence and State of Pennsylvania, have invented certain new and useful Improvements in Water-Purifiers; and I do hereby declare the following to be a full, clear, and exact description of the invention, such as will enable others skilled in the art to which it appertains to make and use the same.

My invention relates to an improved water-purifier, the object of the invention being to provide an improved apparatus for electrolyzing the water in its passage through the same.

With this object in view the invention consists in certain novel features of construction and combinations and arrangements of parts, as will be more fully hereinafter described, and pointed out in the claims.

In the accompanying drawings, Figure 1 is a view in longitudinal section illustrating my improvements. Fig. 2 is a view in cross-section, and Fig. 3 is a view of one of the insulating-frames.

1 represents a cylinder-casing having closed ends and provided with a water-inlet 2 in its top and a water-outlet 3 in its bottom, and internally-insulated tubes 5 are provided in the top for electric conducting-rods 6 and $6^a$, having suitable binding-posts at their upper ends or at opposite ends for the connection of the electric wires.

The cylinder 1 is coated on its inner face with an insulating-covering, and a series of nested cylinders 7 are supported in cylinder-casing 1 and insulated therefrom by nesting frames 8 of rubber or other suitable non-conducting material. These frames 8 are in the form of rings to fit snugly in casing 1, and said rings are connected by diagonal bars having notches or grooves to receive and hold the cylinders 7, and a rod 10, molded in inner cylinder 7, is passed through these frames 8 and the cylinders 7 tightly clamped in position by nuts 11, screwed onto the threaded ends of the rod 10.

The outer face of outer cylinder 7 is provided with an insulating coating to thoroughly insulate the same from casing 1, and said outer cylinder is connected with the one conducting-rod 6, while the other conducting-rod $6^a$ is connected with inner cylinder 7 through the medium of rod 10, as clearly shown.

The cylinders are preferably made of aluminium or an alloy thereof, but may be made of other good conducting material and may be of other shape and form.

The operation is as follows: Rod $6^a$ preferably constitutes the positive conductor and rod 6 the negative, making the inner cylinder the anode and the outer cylinder the cathode, but may be exactly reversed, if preferred. Water admitted at either end passes through between the cylinders 7 and the electric current passes through the water from cylinder to cylinder and perfectly electrolyzes the water, destroying bacteria and precipitating foreign matter therein.

A great many slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a water-purifier, the combination with a shell or casing having a water-inlet at one end and a water-outlet at the other end, of a series of annular electrodes located within the shell or casing and disposed, one within another, means for insulating said electrodes from each other and from the shell or casing, and electrical conductors connected, respectively with the inner and outer electrodes.

2. In a water-purifier, the combination with a shell or casing having a water-inlet and a water-outlet, of insulating-frames located therein and spaced apart, a series of annular electrodes disposed one within another and held between said frames, a rod passing through said frames and the inner electrode, said rod electrically connected with said inner electrode, means for connecting one terminal of an electric generator to said rod, and means for connecting the other terminal of the electrical generator with the outer annular electrode.

3. In an apparatus of the character described, the combination with a cylindrical closed casing having an insulating internal coating and having water inlets and outlets in its ends, of a series of nested cylinders of conducting material, located in the casing and insulated from each other and from the casing, a positive conductor connected with the inner cylinder, and a negative conductor with the outer cylinder.

In testimony whereof I have signed this specification in the presence of two subscribing witnesses.

FRANK B. HINKSON.

Witnesses:
  H. A. NEEB,
  JOSEPH M. FLANNERY.